United States Patent [19]

Knight et al.

[11] Patent Number: 4,763,267
[45] Date of Patent: Aug. 9, 1988

[54] SYSTEM FOR INDICATING TRACK SECTIONS IN AN INTERLOCKING AREA AS OCCUPIED OR UNOCCUPIED

[75] Inventors: Alan C. Knight, Korntal-Muchingen; Helmut Uebel, Gerlingen, both of Fed. Rep. of Germany

[73] Assignee: Alcatel N.V., Amsterdam, Netherlands

[21] Appl. No.: 876,022

[22] Filed: Jun. 19, 1986

[30] Foreign Application Priority Data

Jun. 22, 1985 [DE] Fed. Rep. of Germany ....... 3522418

[51] Int. Cl.$^4$ .............................................. G06F 15/48
[52] U.S. Cl. .................................... 364/436; 364/550; 371/48; 246/131
[58] Field of Search ....................... 364/424, 436, 550; 246/187 C, 187 R, 182 B, 131; 371/69, 36, 48, 68, 67

[56] References Cited

U.S. PATENT DOCUMENTS

| | | | |
|---|---|---|---|
| 4,166,599 | 9/1979 | Auer, Jr. et al. | 364/436 X |
| 4,270,715 | 6/1981 | Norton et al. | 246/5 |
| 4,307,463 | 12/1981 | Sibley | 371/14 |
| 4,361,301 | 11/1982 | Rush | 246/34 R |
| 4,400,792 | 8/1983 | Strelow | 364/900 |
| 4,498,650 | 2/1985 | Smith et al. | 246/122 R |
| 4,590,549 | 5/1986 | Burrage et al. | 364/131 |
| 4,641,243 | 2/1987 | Hartkopf et al. | 364/436 |

Primary Examiner—Parshotam S. Lall
Assistant Examiner—Thomas G. Black
Attorney, Agent, or Firm—Christie, Parker & Hale

[57] ABSTRACT

A system for indicating occupancy of track sections in an interlocking area is disclosed comprising a multicomputer system which is assigned to several track circuits and processes the "unoccupied" or "occupied" indications of these track circuits. The multicomputer system, which is of a fail-safe design, also checks the operation of the associated track circuits and transfers an "unoccupied" or "occupied" indication of an associated track section to the interlocking station only if the test of this track circuit was positive. Any failures detected are also signaled to the interlocking station.

10 Claims, 2 Drawing Sheets

SYSTEM FOR INDICATING TRACK SECTIONS IN AN INTERLOCKING AREA AS OCCUPIED OR UNOCCUPIED

The present invention relates to a system for indicating the presence of trains in an interlocking area as set forth in the preamble of claim 1.

To set up main or shunting routes in interlockings, it is indispensible to determine occupancy in the track sections over which a route is to lead. The route cannot be established until all track sections to be used have been indicated as unoccupied. To indicate a track section as unoccupied or occupied, essentially two devices working on different principles are used, namely the axle counter and the track circuit. While the axle counter counts the vehicle axles entering and leaving a track section by means of so-called rail contacts and indicates the track section as occupied when the number of axles counted at the exit differs from the number of axles counted at the entrance, the track circuit evaluates the short-circuiting action of the vehicle axles by checking by means of so-called track-circuit receivers whether a signal fed by a track-circuit transmitter into the rails at a feed-in point appears at one or more feed-out points with a minimum level.

In the absence of the signal, a vehicle is assumed to be present in the track section, and in the presence of the signal, the track section is assumed to be unoccupied, and corresponding indications are provided. There are track circuits of very simple design for use in track sections limited by insulated joints. In jointless tracks or switches, audio- or radio-frequency track circuits are used.

Different kinds of track-circuit arrangements are desscribed in "Signal +Draht" 73 (1981), No. 7/8, page 186.

There, the "unoccupied" and "occupied" indications are provided via relay contacts connected to the interlocking station by signal cables. An "unoccupied" indication may be provided only via make contacts (closed-circuit principle) for reasons of safety. Failures always result in "occupied" indications. In many arrangements, includinq the track circuits described in the above reference, two separate, nonequivalently controlled relays are used, which has the advantage that some failures can be detected by the lack of nonequivalence of the output and distinguished from regular "occupied" indications.

Track circuits suffer from the drawback that not all failures can be detected immediately; some failures can be detected only by a train movement or an in-situ inspection. For example, an "unoccupied" indication caused by an excessive noise level in the track cannot always be distinguished from a regular "unoccupied" indication unless expsensive coding measures are taken at the transmitting end and corresponding evaluation circuitry is provided at the receiving end. "Occupied" indications caused by component failures are not reliably detected, either, and frequently cause prolonged breakdowns of service.

The object of the invention is to provide a system for indicating track occupancy in an interlocking area which permits regular automatic performance tests of the track circuits used.

A system by which the object of the invention is attained is described by the features set forth in the characterizing part of claim 1.

The computer system makes it possible to cyclically test all track circuits connected to it without hindering the setting operations or without the need for special train movements for testing purposes. False indications as a result of an excessive noise level acting on the track-circuit receiver can be detected even in simple, uncoded track circuits.

In addition, the computer system allows the individual "unoccupied" and "occupied" indications of many track-circuit receivers to be combined and preprocessed, so that transmission to the interlocking station can take place over a serial data bus as claimed in claim 2, which results in considerable savings in cable costs.

A further development of the system according to the invention is described in claim 3. It makes it possible to check the receive thresholds of the individual track-circuit receivers and, thus, to detect any faults in the cables between the computer system and the track-circuit receivers. According to claim 4, the track-circuit transmitters are turned off, and the track-circuit receivers are tested, at regular time intervals. According to claim 5, this is done only after a change from an "occupied" to an "unoccupied" indication. This reduces the number of tests to a necessary minimum.

Claim 6 relates to the interconnection of individual track-circuit receivers for cascading track circuits, and claim 7 to the storage and erasure of malfunctions by the computer system.

Steps to reliably turn off the computer system in the event of a failure and to monitor the operating voltages are the subject matters of claims 8 and 9.

An embodiment of the system according to the invention will now be described in detail with reference to the accompanying drawings, in which.

Figure 1:
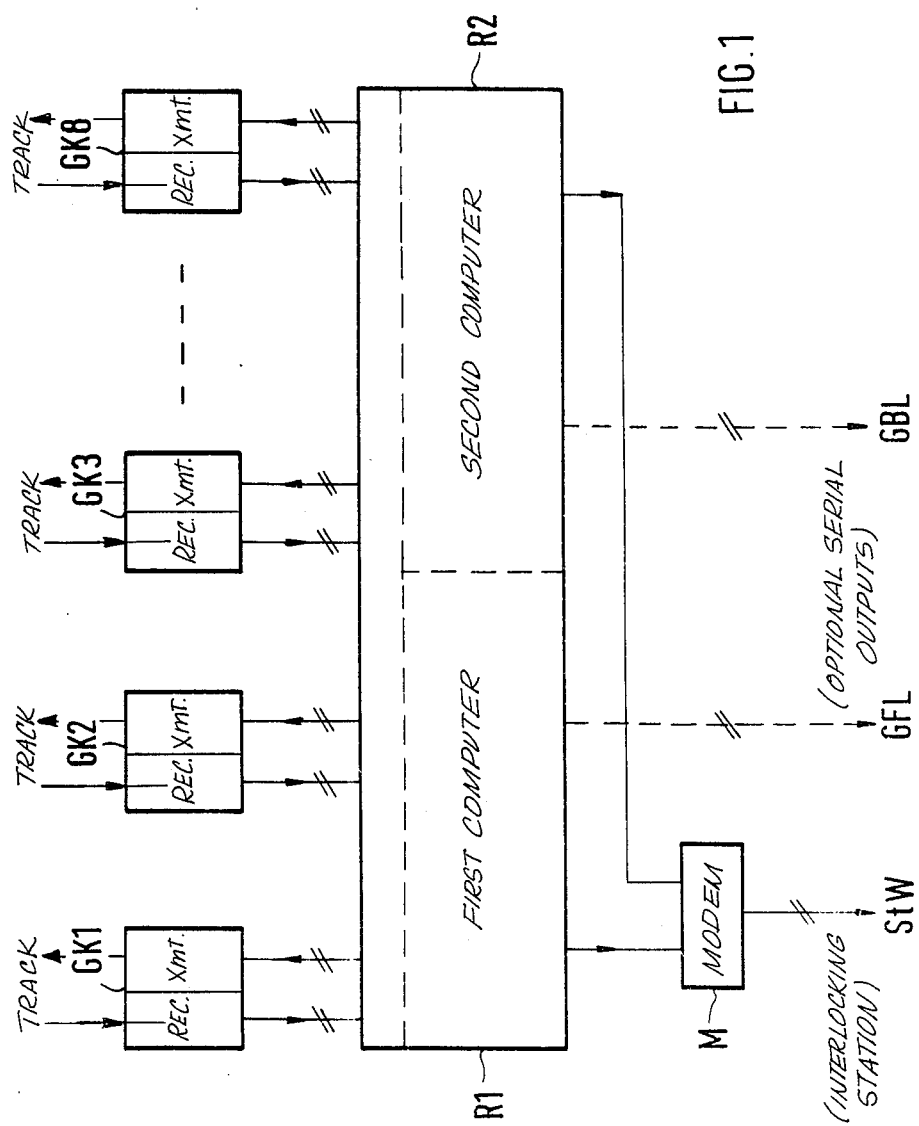
FIG. 1 is a block diagram of the system with 8 track circuits.

In FIG. 1, a total of eight track circuits GK1, ..., GK8 are connected by multiconductor cables to a computer system consisting of two computers R1 and R2. The cables are so designed that it is possible to simultaneously transmit 6 messages from each track circuit to the computer system, and 4 control commands from the computer system to each track circuit. The individual track circuits may thus contain up to three track-circuit receivers.

At the output end, the computer system has a serial data link via a modem M to the interlocking station StW, over which the "unoccupied" or "occupied" indications of all eight track circuits are cyclically signalled to the interlocking station StW. Such serial transmission is particularly advantageous in a solid-state interlocking. In relay-based interlockings, the serially transmitted messages must be converted to parallel form in the interlocking station, or instead of serial transmission, parallel transmission over a multiconductor cable (GFL, GBL) must be chosen. The computers process all messages and generate all control commands in parallel and independent of each other. They exchange the results produced by them and compare the results transferred to them by the adjacent computer with those produced by themselves. A result is further processed, or an "occupied" indication is provided to the interlocking station, only in case of agreement. If a computer detects any disagreement, output to the interlocking station is inhibited.

Figure 2:
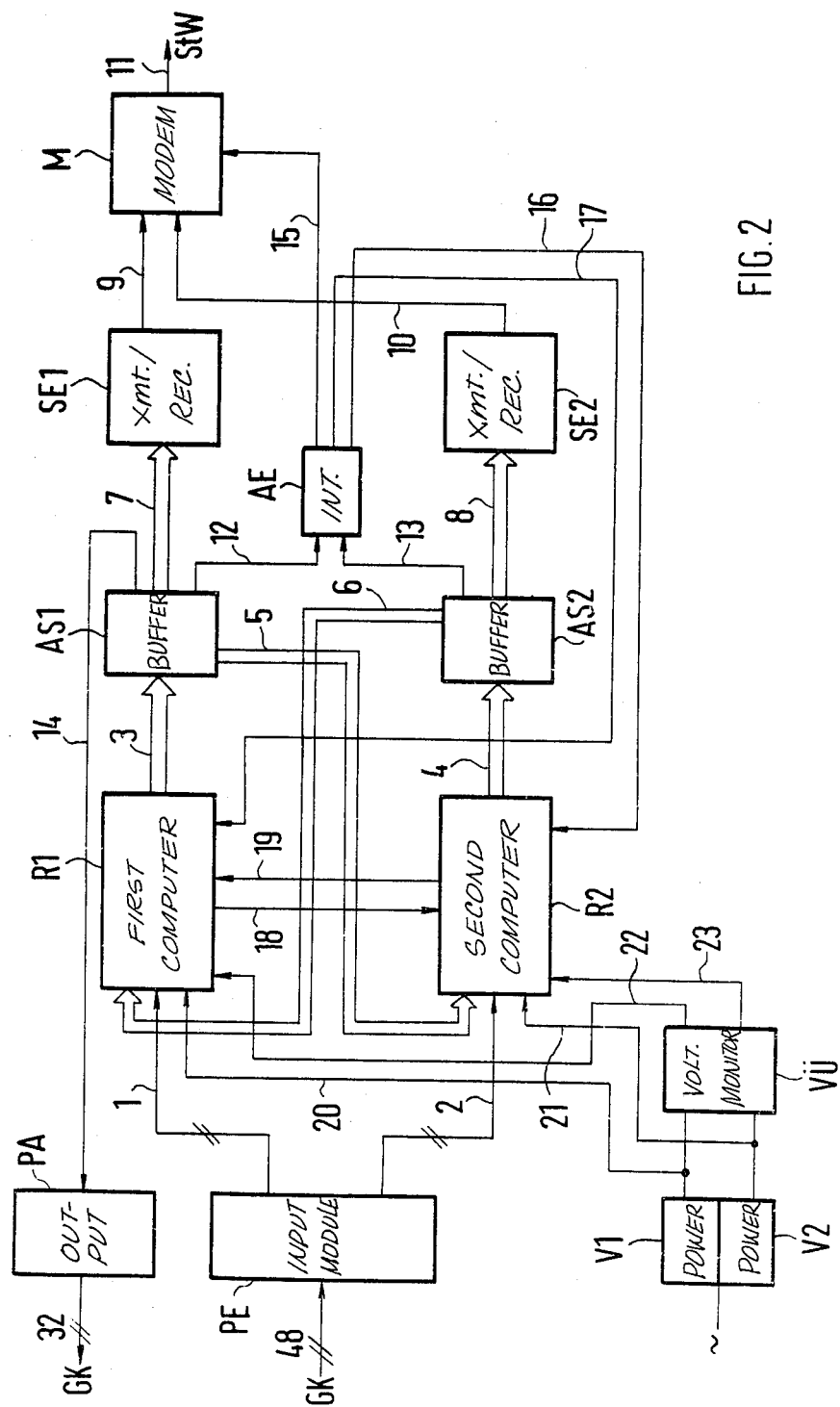
FIG. 2 shows schematically the configuration of the computer system.

FIG. 2 shows the configuration of the computer system, including the interfaces to the track circuits and to the interlocking station.

The "unoccupied" or "occupied" indications of the track circuits are fed to the two computers R1 and R2 through an input module PE containing relays or optocouplers for voltage isolation. The information appearing at the outputs of the input module is cyclically transferred over input busses 1 and 2 into the computers at the clock rate of one of the computers. The necessary operating voltages are supplied to the computers from separate power supplies V1, V2 over power-supply lines 20, 21. Any fall in voltage is detected by a voltage-monitoring circuit VU, which sends, over lines 22 and 23, a reset command to the computer affected and a failure message to the computer not affected. The two computers synchronize each other over interrupt lines 18 and 19 after each program segment. To this end, the faster computer delivers an interrupt pulse when it has completed a program segment and placed its result in an associated output buffer AS1, AS2, to which it is connected by a data bus 3 and an address bus (not shown). It then waits until the slower computer signals the end of the program segment, too. Only then is the data in the output buffers AS1 and AS2 transferred into the computers for comparison. This is done crosswise via data buses 5 and 6. The output buffers are followed by two transmit/receive circuits SE1, SE2, to which the "unoccupied" or "occupied" indications and check information to be outputted to the interlocking station are transferred over parallel data buses 7 and 8. The two transmit/receive circuits feed the modem M alternately via serial data links 9 and 10. The modem is connected to the interlocking station via a transmission channel 11. Transmission takes place in the form of data messages protected by a cyclic code with a Hamming distance of H=4. The transmission channel and the circuits used for transmission are checked from the interlocking station.

If a computer detects an irregularity (For example, during the data comparison or when checking the operating voltages), the delivery of a passivating signal, sent at regular intervals over lines 12 and 13 to an interrupting device AE during trouble-free operation, will be inhibited, thus activating the interrupting device. The latter switches the modem off to interrupt the output of messages to the interlocking station. At the same time, the interruption is communicated to the computers over lines 16, 17, so that the computers can check the interrupting device, which must be fail-safe, cyclically by intentional suppression of the passivating signal. If the transmission channel to the interlocking station is interrupted longer than, e.g., two seconds, it will be blocked in the interlocking station.

The track circuits connected to the computer system are equipped with switching means which can be controlled by the computers via an output module PA, which contains relays or optocouplers for voltage isolation like the input module PE and is connected to the output buffer AS1 of one of the computers by a data bus 14. With these switching means (relays), the track-circuit transmitter can be switched off or a defined resistance can be connected to the input of the track-circuit receiver. With the track-circuit transmitter switched off, it is possible for the computer system to recognize any "unoccupied" indication based on an excessive noise level. To this end, the computer system briefly turns off the transmitter of the track circuit indicated as unoccupied and to be tested, and checks whether all track-circuit receivers provide an "occupied" indication during the "off" phase. If not, a failure indication is provided to the interlocking station. Such a check can be performed routinely at regular time intervals. In the case of frequently used track sections, it suffices to check only once during each "unoccupied" indication phase, immediately after the beginning of the phase. The connection of the defined resistance to the inputs of the track-circuit receivers serves to check the receiver threshold. The resistance simulates an axle resistance and is so chosen that, if the threshold is set correctly, the track-circuit receiver having provided an "unoccupied" indication still responds and provides an "occupied" indication. If the track-circuit receiver does not respond, this indicates that the receiver threshold has changed or that the track-circuit receiver has failed completely. With the two tests just described, it is possible for the first time to cyclically monitor track circuits for proper operation and to detect failures that could hitherto be detected only by a train movement or an in-situ inspection. Even on little used or nearly constantly occupied track sections (e.g., sidings), such a test is possible without any train movement.

We claim:

1. System for indicating whether each of at least two track sections in an interlocking area is unoccupied or occupied to a remote interlocking station, said system comprising:

at least one track circuit associated with each of the individual track sections, each said track circuit comprising a track-circuit transmitter for transmitting an ocupancy detection signal, each said transmitter including switching means responsive to a check signal applied to a test signal input for causing the occupancy detection signal from the individual track-circuit transmitter to be temporarily switched off, and one or more track-circuit receivers each having an input for receiving said occupancy detection signal, each said track circuit receiver having an unoccupancy-indicating output and an occupancy-indicating output responsive to changes in the received occupancy detection signal caused by a change in the occupancy condition of the associated track section, said receiver outputs in a properly functioning track circuit also being responsive to the switching off of the associated transmitter to indicate an occupied condition, thereby providing the capability to distinguish a failure condition from a true non-occupancy condition;

a multi-computer system having at least two independent computers operating in parallel, each having a plurality of inputs respectively connected to all the unoccupancy-indicating outputs and occupancy-indicating outputs of all the track-circuit receivers in the interlocking area and at least one of said computers having at least one test signal output connected to the test signal inputs of all the track-circuit transmitters in the interlocking area, for generating the check signal and for analyzing and checking said receiver outputs in normal operation and in response to the switching off of an associated transmitter and for generating output data indicative of the unoccupied or occupied or failed condition of the individual track circuits, each of said computers responsive to the output data from another of said computers for comparing its own output data for agreement with said output data from another of said computers and for providing a failure indication if a disagreement is detected therebetween; and a communication link between the multi-computer system and the interlocking station for communicating said output data and any said failure indication to the interlocking station.

2. A system as claimed in claim 1, wherein the communication link between the computer system and the interlocking station is a serial data link over which the output data indicative of the unoccupied or occupied or failed conditions of the track circuits connected to the computer system are transmitted in a cyclic sequence in the form of data messages.

3. A system as claimed in claim 1, wherein the receivers of the track circuits connected to the computer system comprise a test resistance and receiver test switching means responsive to the computer system for causing the test resistance to be connected to a respective receiver input to thereby reduce the received occupancy detection signal to a level indicative of an occupied track section, whereby the proper threshold response of the receiver may be checked.

4. A system as claimed in claim 1, wherein the temporary switching off of the track-circuit transmitters and the checking of the operation of the track-circuit receivers take place at regular time intervals.

5. A system as claimed in claim 1, wherein, in the individual track circuits, the temporary switching off of the track-circuit transmitters and the checking of the operation of the track-circuit receivers take place after each change from an "occupied" indication to an "unoccupied" indication.

6. A system as claimed in claim 1, wherein all receivers of a track circuit or all receivers of a chain formed by two or more adjacent track circuits are considered as belonging together, and that the occupancy information of such receivers is combined by said computer system and is transferred to the interlocking station as a single occupancy indication which applies to the track section covered by the respective track circuit or chain or track circuits.

7. A system as claimed in claim 1, wherein short-time failures are registered by the computer system and are signalled to the interlocking station only after repeated recurrence while being erased in case of continued absence.

8. A system as claimed in claim 1, wherein the computer system has a circuit for monitoring its operating voltages associated therewith which, when the operating voltage of a first computer falls below a predetermined value, sends a reset pulse to the first computer and a message to the other computers.

9. A system as claimed in claim 1, wherein
said system further comprises an interrupting device which interrupts the communication link to the interlocking station if it does not receive life signals from two computers at regular time intervals, each computer stops delivering its life signal if a comparison between the result transferred to it from another computer and the result produced by itself shows no agreement or if it has detected a failure, and each interruption by the interrupting device is signalled back to all computers.

10. System for indicating whether each of at least two track sections in an interlocking area is unoccupied or occupied to a remote interlocking station, said system comprising:

at least one track circuit associated with each of the individual track sections, each said track circuit comprising
 a track-circuit transmitter for transmitting an occupancy detection signal, and
 one or more track-circuit receivers each having an input for receiving said occupancy detection signal, each said track circuit receiver having an unoccupancy-indicating output and an occupancy-indicating output responsive to changes in the received occupancy detection signal caused by a change in the occupancy condition of the associated track section, said receiver comprising a test resistance and receiver test switching means responsive to a check signal applied to a test signal input for causing the test resistance to be connected to the respective receiver input to thereby reduce the received occupancy detection signal to a level indicative of an occupied track section, whereby the proper threshold response of the receiver may be checked to provide the capability to distinguish a possible failure condition from a vertified non-occupancy condition;

a multi-computer system having at least two independent computer operating in parallel, each having a plurality of inputs respectively connected to all the unoccupancy-indicating outputs and occupancy-indicating outputs of all the track-circuit receivers in the interlocking area and at least one of said computers having a plurality of outputs respectively connected to the test signal inputs of all the track-circuit receivers in the interlocking area, for generating the check signal and for monitoring and checking and for generating output data indicative of the unoccupied or occupied or failed condition of the individual track circuits, each of said computers responsive to the output data from another of said computers for comparing its own output data for agreement with said output data from another of said computers and for providing a failure indication if a disagreement is detected therebetween; and a communication link between the multi-computer system and the interlocking station for communicating said output data and any said failure indication to the interlocking station.

* * * * *